US006912111B2

(12) United States Patent
Pilschikov et al.

(10) Patent No.: US 6,912,111 B2
(45) Date of Patent: Jun. 28, 2005

(54) IMPULSE LIGHTNING ARRESTERS AND PULSE ARRESTER COLUMNS FOR POWER LINES

(75) Inventors: Vladimir Yevseevich Pilschikov, St. Petersburg (RU); Georgy Victorovich Podporkin, St. Petersburg (RU); Alexander Dmitrievich Sivaev, St. Petersburg (RU)

(73) Assignee: Otkrytoe Aktsionernoe Obschestvo NPO "Streamer", St. Petersburg (RU)

( * ) Notice: Subject to any disclaimer, the term of this patent is extended or adjusted under 35 U.S.C. 154(b) by 0 days.

(21) Appl. No.: 10/312,428

(22) PCT Filed: Jun. 26, 2001

(86) PCT No.: PCT/RU01/00258

§ 371 (c)(1),
(2), (4) Date: Sep. 22, 2003

(87) PCT Pub. No.: WO02/01687

PCT Pub. Date: Jan. 3, 2002

(65) Prior Publication Data

US 2004/0120091 A1 Jun. 24, 2004

(30) Foreign Application Priority Data

Jun. 27, 2000  (RU) ........................................ 2000116337

(51) Int. Cl.$^7$ ................................................. H01C 7/12
(52) U.S. Cl. ....................................................... 361/118
(58) Field of Search ................................. 361/118, 117

(56) References Cited

U.S. PATENT DOCUMENTS 4,363,069 A * 12/1982 Crucius et al. ............. 361/130

4,645,941 A * 2/1987 Nicolas ...................... 307/110

FOREIGN PATENT DOCUMENTS

| CH | 493117  | 8/1970 |
| CH | 506197  | 5/1971 |
| SU | 505065  | 5/1976 |
| SU | 1669026 | 8/1991 |

OTHER PUBLICATIONS

Copy of International Search Report for PCT Publication No. WO 02/01687 (for PCT Ser. No. PCT/RU01/00258).

* cited by examiner

*Primary Examiner*—Brian Sircus
*Assistant Examiner*—James A Demakis
(74) *Attorney, Agent, or Firm*—McCormick, Paulding & Huber LLP

(57) ABSTRACT

The inventive spark arrester comprises an odd number of series-connected spark units forming a chain, with each spark units comprising at least one discharge gap. In order to increase the reliability of protection of electric installation components having a flat voltage—time characteristic by ensuring a low discharge level and a fast response of the arrester, the output of each even spark unit is connected via a resistor to a clamp connecting the arrester to the protected components subjected to a high potential, while the output of each odd spark unit, except the last one, is connected via another resistor to another clamp connecting the arrester to the protected components subjected to a low potential. Preferred embodiments of the arrester promote a generation of a long surface discharge along a surface of tubular body made of a solid dielectric, said body being common for all spark units constituting the arrester. Arresters comprising several tubular bodies and arrester assemblies made of several arresters are also disclosed.

22 Claims, 4 Drawing Sheets

IMPULSE LIGHTNING ARRESTERS AND PULSE ARRESTER COLUMNS FOR POWER LINES

REFERENCE TO PRIOR APPLICATION

Thus application is entitled to the benefit of and incorporates by reference essential subject matter disclosed in PCT patent application No. PCT/RU01/00258 filed on 26 Jun. 2001 and Russian Application No. 2000116337 filed 27 Jun. 2000.

FIELD OF INVENTION

The present invention relates to the field of high-voltage techniques, more precisely, to impulse lightning arresters for protecting components of power transmission lines and high-voltage installations against overvoltages during a thunderstorm, said arresters consisting of series-connected spark gaps assembled into a chain of N (N=odd number equal to or eater than 3) series-connected spark units (or modules). The invention also relates to arrester assemblies (or columns) consisting of several arresters of the described type.

BACKGROUND OF THE INVENTION

Widely used prior art spark lightning arresters comprise a plurality of spark gaps (also called discharge gaps), each gap consisting of a pair of electrodes (a typical spark gap design is described, for example, in *High Voltage Equipment*, ed. by D. V. Razevig, 1976, Energy Publishers, Moscow, p. 297, FIG. 16-10). Examples of lightning arresters comprising several spark gaps are given on page 299 of said book and in Russian Patent No. 2,096,882 owned by the assignee of the present application. In case a large number of spark gaps are used, said gaps can be grouped into spark units, with some of said units comprising greater than one spark gaps (as shown in FIG. 16-13 of the above-cited book).

For lighting protection of high-voltage electric equipment, arrester assemblies consisting of series-connected arresters of a lower voltage class are also used (as described, for example, in *High Voltage Equipment*, ed. by D. V. Razevig, 1976, Energy Publishers, Moscow, p. 301, FIG. 16-14).

Arresters comprising a chain of spark units and arrester assemblies provide a long flashover path; therefore their use prevents lightning flashover from developing into a power arc, so that the electric installation protected by such arrester or such assembly continues uninterrupted operation. However, as the spark units are connected in series, a lightning overvoltage applied to the arrester is distributed among its spark units. As a result, the arrester's discharge voltage is on the whole much higher than that of one individual spark unit, and for that reason it is often difficult to ensure a desired low level of overvoltage limitation.

In a impulse mode, the voltage distribution among the spark units is determined by their own capacities and by their capacities relative to earth. In other words, the arrester comprising series-connected spark units constitutes a capacitive chain. Surge voltage is very unevenly distributed over such a chain, which results in a cascade break-down of all the spark units, with a sequential break-down of each of discharge gaps of the individual units.

An example of the cascade lightning arrester is an impulse spark lightning arrester comprising a first clamp and a second clamp for connecting the arrester to components of a power transmission line or an electric installation, which clamps are under a high and low potential, respectively; and a chain of N series-connected spark units, each comprising a discharge gap formed by a first electrode and a second electrode electrically connected to the input and output of said spark unit. The input of the first spark unit and the output of the Nth spark unit are connected to the first and the second clamp, respectively (see *High Voltage Equipment*, ed. by D. V. Razevig, 1976, Energy Publishers, Moscow, p. 303, FIG. 16-16).

A time front of lightning overvoltage impulse has duration of about 1 $\mu$s (microsecond), which is equivalent to the frequency f of alternating voltage of approximately 200 kHz. For such a high frequency, the resistance $x_C$ of an additional shunt capacitor C is quite small, since this resistance is inverse to the impulse frequency: $x_C = \frac{1}{2\pi f C}$. As an example, for C=200 pF, the resistance of the shunt capacitor is about 4 kOhms. Therefore, due to the presence of the additional capacitor, the second electrode of the discharge gap of the first spark unit becomes connected to the ground via a relatively small resistance. Thus, voltage applied to the chain of spark units becomes applied practically entirely to the first gap alone. Meanwhile, other spark units in the chain are not subjected to any voltage. Under the impact of the applied voltage, the discharge gap of the first spark unit breaks down, and the entire voltage, due to the presence of the second shunt capacitor, becomes now applied to the second spark unit, and so on. Therefore, the arrester's triggering under application of a low voltage is ensured. However, the described cascade scheme, based on the sequential response of the spark units forming the chain, results in that the total response time of the arrester T becomes equal to the sum of response times t of all N single spark units: $T = t_1 + t_2 + \ldots + t_n$, that is a substantial increase of said response time takes place.

As a consequence, the voltage—time characteristic of the prior art arrester in the domain of fast response times (about 1 $\mu$s) is quite steep, and this prevents the use of said arrester for protection of facilities with a flat voltage—time characteristic, such as cable links or transformers, when they are exposed to steep overvoltage impulses, since the arrester's response time is long enough for the impact overvoltage to grow to values dangerous to the insulation of the protected facility.

After the lightning impulse is over, the spark unit chain, due to the flashover of all spark units, remains exposed to an industrial voltage of 50 Hz frequency. At this stage, an even distribution of voltage over all the spark units is advantageous for more efficient extinction of an electric arc resulting from a follow-up current in each unit. However, at 50 Hz frequency, the resistances of the additional capacitances C are rather large, so they do not have a notable effect on the voltage distribution over the spark units.

Another example of a cascade spark arrester is the impulse spark arrester for overvoltage protection according to SU 1,669,026. An arrester disclosed therein comprises a first clamp and a second clamp for connecting the arrester to components of a power transmission line or of an electric installation, which clamps are under a high and low potential, respectively; and a chain of N (N=odd number equal to or greater than 3) series-connected spark units. Each unit comprises at least one discharge gap formed by a first main electrode and a second main electrode, which electrodes being electrically connected to an input and an output, respectively, of said spark unit, the input of the first spark unit and the output of the Nth spark unit being connected to the first and the second clamps, respectively. The prior art arrester further comprises N−1 resistors, the output of each odd spark unit, except the last one, being connected to the second clamp via one of said resistors, while the output of each even spark unit is connected to the first clamp via another of said resistors. This arrester, which has some features in common with the arrester of the present invention, essentially solves the problem connected to the cascade break-down. Nevertheless, there still remains a need for improvements in the design of the arresters of this type.

SUMMARY OF THE INVENTION

It is a principal object of the present invention to provide a reliable lightning arrester for protecting high-voltage installations against lightning overvoltage.

Another object is to provide assemblies of electrically connected impulse spark lightning arresters to protect components of power lines or electric installations.

To achieve the above-stated objects, an impulse spark lightning arrester for protecting components of power lines or electric installations is proposed. The arrester of the invention, similar to the above-described prior art one, comprises a first clamp and a second clamp for connecting the arrester to components of a power transmission line or of an electric installation, subjected to a higher and a lower potential, respectively; and a chain of N (N=odd number equal to or greater than 3) series-connected spark units. Each unit comprises at least one discharge gap formed by a first main electrode and a second main electrode, said electrodes being electrically connected to the input and output, respectively, of said spark unit, the input of a first spark unit and the output of a Nth spark unit being connected to the first and the second clamp, respectively. The arrester of the invention further comprises N−1 resistors, the output of each odd spark unit, except the last one, being connected to the second clamp via one of said resistors, while the output of each even spark unit is connected to the first clamp via another of said resistors.

A main distinctive feature of the claimed arrester consist in that the resistance of each Kth (K=1, 2, ... N−1) resistor meets one of the following conditions:

$R_K > R_{K+2}$ for an odd K, $R_K < R_{K+2}$ for an even K.

The following features may be indicated as essential for some or all of the preferred embodiments of the arrester.

The resistors are made of a nonlinear semiconductive material, which feature facilitates ensuring required resistance values for said resistors.

At least one of the spark units (preferably each unit) additionally comprises a body made of a solid dielectric, with the first and the second main electrodes mounted on a surface of said body so as to enable a generation of a surface discharge between said electrodes. The development area of such discharge is preferably filled with fine insulation material (such as quartz sand). In case the surface discharge is employed, it is also desirable to place the arrester inside an insulating sheath and to provide the arrester with at least one nonlinear resistor connected between one of the clamps and its adjacent spark unit, in order to route a surface discharge current to said nonlinear resistor.

In one of the preferred embodiments of the impulse arresters of the present invention the solid dielectric body has a shape of an elongated cup, with the first and the second main electrodes arranged at its ends. In this case an additional electrode shall be arranged inside said body over its entire length. The additional electrode shall be electrically connected to the second electrode and insulated from the first electrode.

In some of preferred embodiments of the arrester, the solid dielectric body is common for all spark units, each of said units being arranged for generating a surface discharge between the first main electrode and the second main electrode. The resistors in this case may be located inside said common solid body or on its outer surface.

In one of the embodiments of the impulse arrester according to the present invention the first clamp and the second clamp are mounted at the opposite ends of the common solid body, while N coaxial spaced apart sheds made of a dielectric material are provided on its side surface. On the opposite surfaces of each fin, at its base, the first electrode and the second electrode of one of the spark units are arranged.

In the next embodiment of the arrester, all spark units are arranged so as to enable a generation of a discharge over the inner surface of the common tubular body of a solid dielectric. Further, the first electrode of the first spark unit and the second electrode of the third spark unit are mounted at the opposite ends of said tubular body. The second electrode of the first spark unit and the second electrode of the second spark unit are mounted on the inner side surface of the common tubular body. The latter two electrodes serve also as the first electrode of the second spark unit and the first electrode of the third spark unit, respectively, while the resistors are made of a semiconductive material and are arranged on the outer surface of the tubular body at a certain distance from each other. The inner cavity of said tubular body, at least in its part adjacent to the outer surface where the flashover discharge is generated, is filled with fine-grained insulating material.

In still another preferred embodiment of the impulse arrester, the arrester comprises not one, but two tubular bodies made of a solid dielectric, wherein a center electrode is mounted on the outer surface of each of said tubular bodies, and wherein a first end electrode and a second end electrode are mounted at the ends of each solid body. Further, the second end electrode and the center electrode of the first tubular body are electrically connected to the center electrode and the first end electrode, respectively, of the second tubular body. In this arrangement, the first and the second main electrodes of the first spark unit are formed by the first end electrode and the center electrode, respectively, of the first tubular body, said spark unit comprising a part of this tubular body located between said electrodes. The first and the second main electrodes of the second spark unit are formed by the connections of the center electrode and the second end electrode, respectively, of the first tubular body with the first end electrode and the center electrode, respectively, of the second tubular body. The second spark unit further comprises parts of said two tubular bodies located between said connections. Similar to the first spark unit, the first and the second main electrodes of the third spark unit are formed by the center electrode and the second end electrode, respectively, of the second tubular body, said spark unit comprising a part of the second tubular body located between said electrodes.

The resistors in the latter embodiment of the arrester are designed as rod electrodes made of a semiconductive material, said electrodes extending inside said tubular bodies and being connected to the end electrodes installed on that tubular body, inside of which said rod electrodes are mounted.

In another aspect, the present invention provides an arrester assembly of M (M being equal to, or greater than 2) electrically connected (e.g. in series) impulse spark lightning arresters for protecting components of power lines or electric installations. One of said arresters is provided with a first clamp for connecting the assembly to components of the power line or the electric installation subjected to a high electrical potential, while another of said arresters is provided with a second clamp to connect the assembly to low-potential components of said power line or electric installation. The main distinction of the assembly according to the present invention from prior art assemblies of this type is that each, or at least one, of the arresters constituting the assembly is constituted by any of the above-described embodiments of the arrester according to the present invention.

According to a preferred embodiment of the proposed assembly, all arresters constituting the assembly may be similar in their design and parameters. Where both similar arresters of the assembly contain two tubular bodies each, the center electrode of the second tubular body of the first arrester can be connected to the first clamp of the second arrester, while the second clamp of the first arrester can be connected to the center electrode of the first tubular body of the second arrester.

In another embodiment of the arrester assembly of the invention also using two arresters, each arrester comprising two tubular bodies, said arresters have different characteristics. One of said arresters serves as the main arrester, i.e. determines the lightning overvoltage protection properties, while the second, smaller arrester serves to enhance the properties of the main one. This second arrester is connected in parallel to the second unit of the first arrester, and discharge voltages of the first and the third spark units of the first arrester are selected essentially similar to a discharge voltage of the second arrester.

Also, different types of arresters may be combined in a single assembly. For instance, one of two arresters constituting the assembly and having a common body made of a solid dielectric can comprise, as described above, electrodes mounted on the inner surface of said common tubular body and one or two nonlinear resistors installed inside the tubular body to close a current circuit for a discharge developing in the fine-grained insulating material. The second arrester may in this case correspond to the above-described arrester embodiment with two tubular bodies.

BRIEF DESCRIPTION OF DRAWINGS

The present invention will now be described in detail in conjunction with the accompanying drawings, wherein.

PREFERRED EMBODIMENTS OF THE INVENTION

Figure 1:
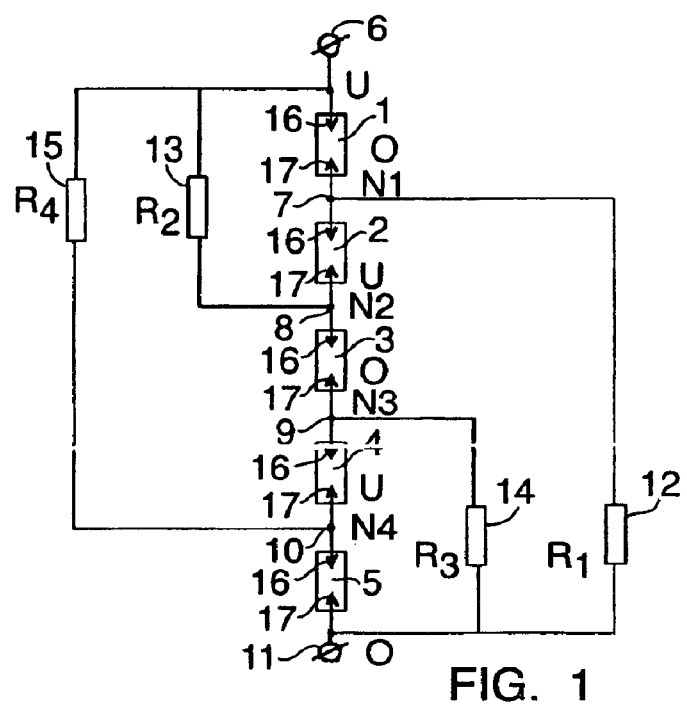
FIG. 1 shows a simplified diagram of an impulse lightning arrester comprising a chain of five spark units.

FIG. 1 presents a scheme of electrical connections for an impulse lightning arrester comprising a chain of N (N=5) spark units N1 to N5. To facilitate understanding, each spark unit is shown as comprising only one spark gap, the gaps being designated as 1' to 5'. A first clamp 6, so-called "potential clamp" is connected to the input of the first spark unit N1 and serves to connect the arrester (either directly, or via an intermediate component, such as another arrester) to a component (such as a power line conductor) of a power transmission line subjected to a high electrical potential U.

The spark units N1–N5 are connected in series, i.e. the output of each of the spark units N1–N4 is connected to the input of the next spark unit N2 to N5, respectively, at an appropriate point (these connection points being designated as 7 to 10). A second, or "ground" clamp 11 of the arrester connected to the output of the last spark unit N5, i.e. to the second electrode of this unit, serves to connect the arrester (either directly, or via an intermediate component) to a grounded component of the power transmission line (such as a power transmission tower), said component having a zero potential. Correspondingly, the potential of clamp 11 is designated in FIG. 1 as 0.

The arrester is also provided with K (K=N−1=4) conducting components, constituted, according to the present invention, by resistors 12 to 15. The first resistor 12 and the third resistor 14 are connected between the "ground" clamp 11 and the outputs of the odd (the first and the third) spark units N1 and N3, respectively (at connection points 7 and 9). Due to these connections, said points 7, 9 acquire the potential of the "ground" clamp 11. The second resistor 13 and the fourth resistor 15 are connected between the "potential" clamp 6 and the outputs of the even spark units N2 and N4, respectively (at connection points 8, 10). Hence, said points 8, 10 acquire potential U. Thus, each of the spark units N1 to N5 is exposed to the electric potential U.

Each spark unit comprises a first electrode 16 and a second electrode 17, both electrodes 16, 17 being electrically connected respectively to the input and the output of the corresponding spark unit. Each pair of electrodes 16, 17 forms a discharge gap where a spark channel between said electrodes is formed whenever an overvoltage of sufficient magnitude occurs.

The above-described embodiment of the impulse lightning arrester of the invention operates as follows.

Whenever a lightning overvoltage occurs, its full potential U will be applied to each spark gap 1' to 5' simultaneously, due to a presence of the resistors 12 to 15 connected as described above. Under the impact of the overvoltage, a discharge develops between electrodes 16 and 17 of all spark gaps 1' to 5', which results in break-down of the spark gaps of all spark units N1 to N5. In this way an electric path of a very low resistance (about several Ohms) is created for the surge current due to lightning flowing from a high-voltage component (such as the power line conductor) to the ground. The voltage drop in the thus created common path due to the flashover of the spark units chain is rather low. Therefore an impact of the lightning overvoltage on the protected power transmission component is limited to an allowable level.

Owing to the arc-suppressing properties of the spark gaps formed between electrodes 16 and 17, the follow-up arc current will be quenched as soon as the lightning surge current has passed, so that the power transmission component protected by the arrester will continue its uninterrupted operation.

Due to the statistical nature of the spark discharge development, non-simultaneous flashover of the spark units is possible even with the full overvoltage potential applied to each spark unit. To ensure a fast response of all spark units under such circumstances, it is preferable to ensure a certain relationship, or correlation between resistances of the resistors 12 ($R_1$) and 14 ($R_3$), as well as those of the resistors 13 ($R_2$) and 15 ($R_4$).

For example, if spark unit N1 is the first to respond, the discharge current will flow from clamp 6 via said unit, then via resistor 12 ($R_1$) to the "ground" clamp 11 and therefrom to the ground. The resistance of the flashover path between main electrodes 16 and 17 is very low (a few Ohms); therefore, virtually all the voltage drop U will become applied to resistor 12 ($R_1$). Therefore, resistor 12 ($R_1$) must in this case have a sufficiently high value (several hundred Ohms), in order to, first, restrict the current flowing through the first spark unit N1, and second, to ensure a voltage drop on said resistor that is sufficiently high to enable the response of other spark units N2–N5.

If both spark units N1 and N3 are the first to respond, current runs through them and through the respective resistors 12, 14, so that a voltage drop equal to the difference of voltage drops on the resistor 12 (having the resistance $R_1$) and the resistor 14 (having the resistance $R_3$) is now applied to the spark unit N2. For the spark unit to respond, the voltage drop on the resistor 14 has to be less than the voltage drop on the resistor 12. Therefore, the resistance $R_1$ has to be higher than the resistance $R_3$.

A similar relation between the resistances $R_2$ and $R_4$ shall exist for the resistors 13 and 15.

In a general case, it is advantageous to select resistance values R for employed resistors in accordance with the following relationships:

$R_K > R_{K+2}$ for any odd K, $R_K < R_{K+2}$ for any even K, where K is a resistor number.

It should be noted that in the arrester according to the invention non-simultaneity in responses of the spark units is determined only by a statistical nature of a gap response characteristic (for example, by statistics of free electrons appearance in discharge gaps). Consequently, the response time of the arrester is much shorter than that of the prior art arrester having the total time of the response equal to a sum of response times of all individual spark gaps included into said arrester.

Figure 2:
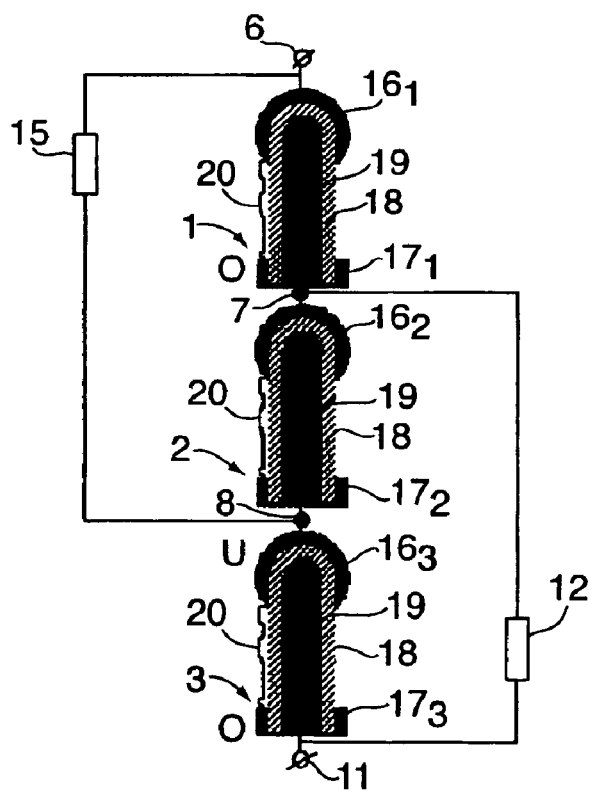
FIGS. 2 to 5 show alternative embodiments of the impulse lightning arrester with tubular bodies made of a solid dielectric, along which a surface discharge will develop.

FIG. 2 shows, in a simplified form, a first embodiment of the impulse lightning arrester according to the present invention. In this embodiment the arrester comprises three spark units 1 to 3 ensuring a development of a surface discharge at very low values of lightning overvoltage.

Each of spark units 1, 2, 3 has a tubular insulator body of a solid dielectric shaped as an extended cup 18 with a bell-shaped end, at which end the first electrode 16 is installed. The second electrode 17 is located on the outer surface of the opposite end of cup 18. On the inner surface of insulator cup 18 an additional electrode 19 is installed, which is electrically connected to the second electrode 17 and isolated from the first electrode 16. The first electrode 16, (i.e. the input) of first spark unit 1 is connected to the "potential" clamp 6; the second electrode 17₃ (i.e. the output) of the third, and last, spark unit 3 is connected to the "ground" clamp 11.

Additional electrode 19 provided in each spark unit and connected to second main electrode 17 ensures high electric field strength at the first main electrode 16 when an overvoltage occurs. Moreover, additional electrode 19 enables development of surface discharge 20 in each of the spark units 1 to 3, i.e. of a surface discharge with a conducting substrate provided on another surface of the insulator body. These two factors ensure quite low discharge voltages, which is a notable advantage of this embodiment of the arrester.

The arrester is provided with two resistors 12, 15. The first resistor 12 is connected between the "ground" clamp 11 and the output of the first (odd) spark unit 1, respectively (at point 7). The second resistor 15 is connected between the "potential" clamp 6 and the output of the second (even) unit 2 (at point 8). Due to this, points 7 and 8 acquire potentials of the "zero" and "potential" clamp 6, 11, respectively. Thus, each of spark units 1–3 becomes exposed to the voltage drop U.

Figure 3:
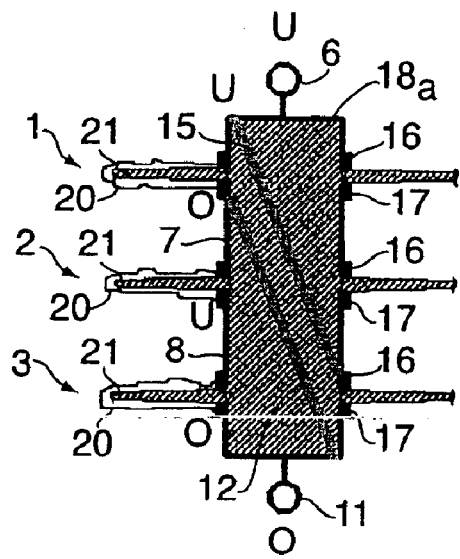

FIG. 3 presents another embodiment of the arrester having N spark units, with N again being equal to 3. Unlike the previous embodiment, the one of FIG. 3 has a single cylinder-shaped body 18a of a solid dielectric, which body is common for all spark units 1 to 3. Located at the opposite ends of said body are the first, "potential" clamp 6 and the second, "ground" clamp 11, while its side surface has N (i.e. three) coaxial sheds 21 made of a dielectric material, such as porcelain, and mutually spaced apart along the axis of the body 18a, preferably by similar distances. On the top surfaces of the three sheds 21, at their bases, first electrodes 16 of the three spark units 1 to 3 are arranged. On the opposite (bottom) surfaces of the three sheds 21 second electrodes 17 of spark units 1 to 3 are arranged in a similar way. As in the previous embodiment, the input of the first spark unit 1 (i.e. its first electrode 16₁) and the output (the second electrode 17₃) of the last spark unit 3 are connected to the first and the second clamps 6, 11, respectively.

The arrester embodiment presented in FIG. 3 comprises also K (K=N−1=2) resistors 12, 15 connected in the similar way as in the previous embodiment of the arrester (see FIG. 2). In the embodiment of FIG. 3, however, the resistors are located inside the solid body 18a and are preferably made of a semiconductive material in order to ensure the required resistance value of about several hundred Ohms.

Under the impact of the overvoltage U of a sufficient magnitude, surface. discharges 20 develop over the surfaces of the sheds 21 in the spark units 1, 2 and 3. After the flashover of all spark units takes place, the "potential" clamp 6 and the "ground" clamp 7 of the arrester become connected via a common path 20 of the discharge. Due to a rather large length of the path 20, it quickly cools down after the passing lightning surge current, and no power arc current resulting from the applied power-frequency voltage appears.

A pilot model of the arrester presented in FIG. 3 was tested. Said model was made of polyamide and had the following main dimensions:

| | |
|---|---|
| diameter of tubular body 18a | 30 mm |
| diameter of sheds 21 | 80 mm |
| thickness of sheds 21 | 3 mm |
| resistance of resistors 12, 15 | 9 kOhms. |

The test was conducted under the impact of a standard lightning overvoltage impulse of 1.2/50 μs. Without the resistors 12 and 15 ensuring a distribution of the voltage drop among the spark units, the arrester's discharge voltage was about 80 kV. With the resistors 12 and 15 in place, the discharge voltage equaled 36 kV, i.e. it was about twice as low. Thus, it was experimentally shown that with the use of the arrester according to the described embodiment of the invention, the discharge voltage of the arrester, starting from which its protective action takes place, can be significantly reduced.

Figure 4:
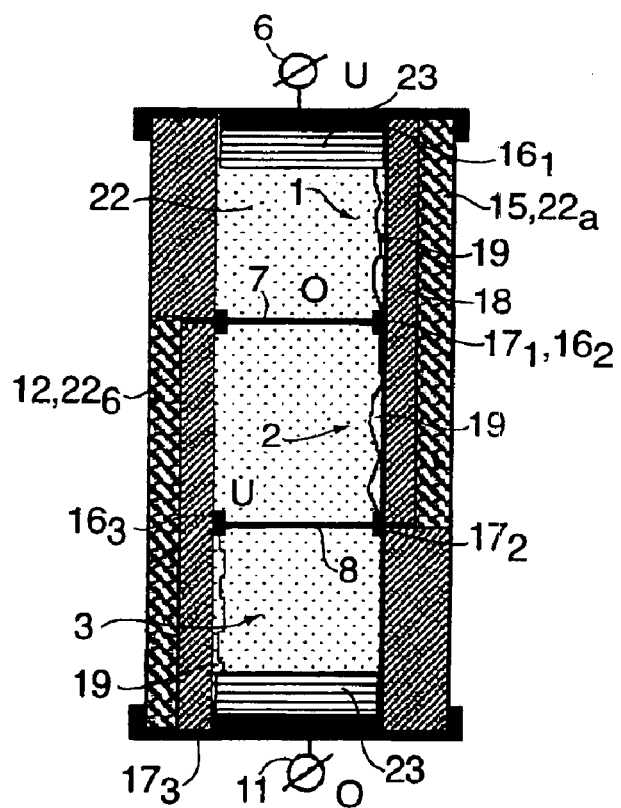

FIG. 4 presents still another embodiment of the arrester of the present invention, according to which the main electrodes 16, 17 of all three spark units 1, 2, 3 are arranged inside the common tubular insulator body 18a. The first, "potential" clamp 6 and the second, "ground" clamp 11 are respectively arranged at the top and at the bottom ends of the tubular body 18a.

The first electrode $16_1$ of the first spark unit 1 is located inside the tubular insulator body 18a, at its end, and is connected to the "potential" clamp 6, which is under potential U, and to an additional electrode 22a (which also serves as the resistor 15). The electrode 22a is mounted on the outer surface of the tubular body 18a (or, as shown in FIG. 4, in a groove formed in the outer surface of the tubular body 18a).

The second electrode $17_1$ of the first spark unit 1 is located at a distance from the first electrode $16_1$, said distance corresponding to approximately one third of a length of the tubular body 18a. This electrode $17_1$ is connected to the "ground" clamp 11 via an additional electrode 22b made of a semiconductive material and serving also as the resistor 12.

The second electrode $17_1$ of the first spark unit 1 serves simultaneously as the first electrode $16_2$ of the second spark unit 2. The second main electrode $17_2$ of the second spark unit 2 is located at a distance of approximately one-third of the length of the tubular body 18a from the first electrode $16_2$ of said unit and is connected to the resistor 15 serving to supply the potential U from the "potential" clamp 6 to the first electrode $16_3$ of the third spark unit 3.

The third spark unit 3 is designed similar to the spark unit 1 as described above, that is it comprises the first main electrode $16_3$ and the second main electrode $17_3$ located at a distance therefrom, inside the tubular insulator body 18a, near its bottom end, and connected to the "ground" clamp 11 staying under zero potential.

The inner space of the tubular body 18a is filled with fine-grained insulating material 22, such as quartz sand (QS).

To improve the performances of the arrester, it may be provided with at least one nonlinear component 23 arranged inside the tubular body 18a and included into the current circuit. Under the impact of a lightning overvoltage, a path of the surface discharge 20 develops along the inner surface of the tubular body 18a in spark unit 1. Development of this discharge is promoted by additional electrodes 22a and 22b (this role of the additional electrodes is illustrated in FIG. 4 by the fact that in the first and the third spark units 1, 3 the creeping discharge develops on that side of the tubular body 18a, which is adjoined by the additional electrode 22; while in the second spark unit 2 interacting with both additional electrodes the creeping discharge can, with similar probability, develop on both sides of the tubular body).

Filling of the cavity of the tubular body 18a with a fine-grained insulator material ensures efficient quenching of the follow-up arc current. During the passage of a lightning overvoltage impulse, the nonlinear component 23 has a low resistance, and when the lightning impulse is over, its resistance rises sharply and the follow-up arc current strength is restricted, which promotes efficient arc quenching in the spark gaps. The combination of efficient arc quenching and compact design is the main advantage of the arrester embodiment shown in FIG. 4.

Figure 5:
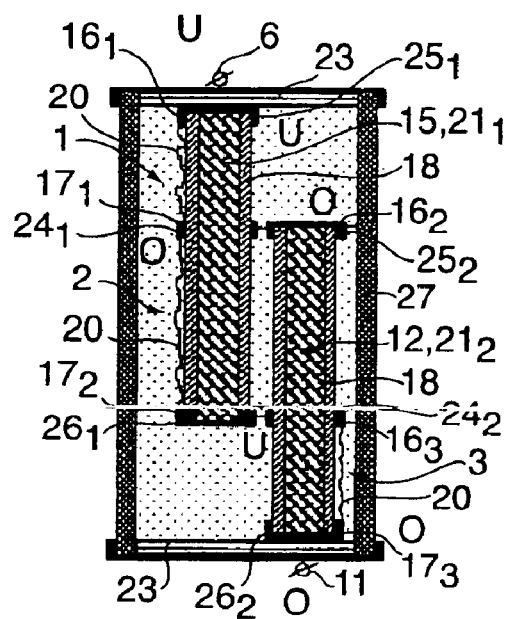

FIG. 5 presents still another embodiment of the impulse lightning arrester, also having three spark units 1, 2, 3 formed, in contrast with the previous embodiments, with the use of two tubular bodies $18_1$, $18_2$ made of the solid dielectric. A center electrode $24_1$, $24_2$ is installed on the outer surface of each tubular body $18_1$, $18_2$ in its middle part; a first end electrodes $25_1$, $25_2$ are installed at the top end of each tubular body, and a second end electrodes $26_1$, $26_2$, are installed at its bottom end. Furthermore, as it is shown in FIG. 5, the first end electrode $25_1$ of the first tubular body $18_1$ and the second end electrode $26_2$ of the second tubular body are connected to the first, "potential" clamp 6 of the arrester and to the second, "ground" clamp 11, respectively. The second end electrode $26_1$ and the center electrode $24_1$ of the first tubular body $18_1$ are electrically connected to the center electrode $24_2$ of the second tubular body $18_2$ and to its first end electrode $25_2$, respectively.

Thus, in this embodiment of the arrester, the first spark unit 1 is formed by the first end electrode $25_1$ and by the center electrode $24_1$ of the first tubular body $18_1$ (said electrodes $25_1$ and $24_1$ serving as the first electrode $16_1$ and the second electrode $17_1$) and by a part of said tubular body confined between the electrodes $25_1$ and $24_1$.

The first main electrode $16_2$ of the second spark unit 2 is formed by connecting center electrode $24_1$ of the first tubular body $18_1$ to the first end electrode $25_2$ of the second tubular body $18_2$; the second main electrode $17_2$ of that unit is formed by connections of the second end electrode $26_1$ of the first tubular body $18_1$ to the center electrode $24_2$ of the second tubular body $18_2$. In this case, said spark unit 2 contains also those parts of both tubular bodies, which are confined between said connections.

The design of the third spark unit 3 is similar to the design of unit 1: it is formed by the center electrode $24_2$ and the second end electrode $26_2$ of the second tubular body $18_2$ (which electrodes serve as the first main electrode $16_3$ and the second main electrode $17_3$, respectively) and a part of said tubular body confined between said electrodes.

The functions of the resistors 15 and 12 connecting the second electrode $17_1$ of the first spark unit and the second electrode $17_2$ of the second spark unit to the "zero" and "potential" clamps 11, 6, respectively, are performed by additional rod electrodes $21_2$ and $21_1$ installed inside the second tubular body $18_2$ and the first tubular body $18_1$.

Thus, this embodiment of the arrester also provides, for all three spark units 1, 2, 3, conditions necessary for simultaneous development of the surface discharges 20 between the respective main electrodes of each unit. These surface discharges 20 generate a long common flashover path as a result of the break-down of all spark units following a lightning overvoltage.

As was mentioned above, a distinctive feature of this embodiment is the use of two tubular bodies $18_1$ and $18_2$, due to which use the discharge gap of the second spark unit is formed not by two, but by four electrodes $24_1$–$25_2$ and $26_1$–$24_2$ connected in pairs. Furthermore, the distance between the tubular bodies and their relative orientation may be adjusted to suit specific design requirements for the arrester and/or specific conditions of its application.

An advantage of this embodiment (as well as the previous one) of the arrester is combining by components $21_1$ and $21_2$ the functions of additional electrodes promoting development of the surface discharge and resistors providing the required potential distribution in accordance with the present invention.

The serviceability and efficiency of the embodiment presented in FIG. 5 when applied to arresters of the 10 kV class was experimentally tested. The test model of the arrester was made using two lengths of cable with a semiconductive polyethylene core performing the functions of resistors and additional electrodes. The core diameter was 10 mm, and the resistance of each resistor was 400 Ohms. The tubular bodies were formed by insulating said cable lengths with high-pressure polyethylene. The tubular body wall thickness was 3 mm. The length of each spark unit 1, 2, 3 was about 27 cm. Thus, the overall flashover length was about 80 cm. The discharge voltage of the arrester under the impact of a standard lightning impulse (1.2/50 μs) was 80 kV. It should be noted that with a chain of three spark units of a similar design, but without the resistors enforcing potential distribution among the electrodes, the discharge voltage is about 150 kV, i.e. much higher.

With design characteristics properly selected, all the above-described embodiments of the impulse lightning arrester of the invention ensure reliable response of the arrester at relatively low magnitudes of lightning overvoltages, due to the virtually simultaneous response of all spark units, with subsequent connection of the spark units' discharge filaments into a single current path. All of the described embodiments are easy to manufacture and reliable in operation. Furthermore, other embodiments of the present invention are also possible. For instance, to improve the power arc quenching efficiency, the arresters may be inserted into an insulation sheath 27 filled with fine-grained insulator material 22, such as quartz sand QS, as it is shown in relation to the arrester embodiment of FIG. 5 (the efficiency of such solution is demonstrated in the Russian Patent No. 2,146,847 owned by the assignee of the present application).

Where filling with fine insulation material is used, it is advisable, as shown in FIG. 5, to provide the arrester additionally with at least one nonlinear resistor 23 installed between one of clamps 6 (11) and the adjacent first (last) spark unit, for routing to said nonlinear resistor the surface discharge developing in said insulation material. It is preferable to use in this case nonlinear resistors (varistors) connected to both clamps 6, 11.

In addition, for efficient quenching of the follow-up arc current in case of only one spark unit responding properly (which situation is possible on very rare occasions, at relatively low overvoltage magnitudes), it is advisable to form the resistors 12 and 15 also as nonlinear components (varistors). For example, for a 10 kV-class arrester, the nonlinear resistor 23 can be made of varistor discs with a diameter of 50 mm, and resistors 12 and 15 can be made of varistor discs with a diameter of 8 mm. If the overvoltage just slightly exceeds the arrester's response voltage, a flashover can have place only in one spark unit, for example, in the spark unit 1 (see FIG. 5). In such case the lightning surge current flows from the clamp 6 via the nonlinear resistor 23, via the first electrode $16_1$, of the first spark unit, via the lightning flashover path 20, via the second electrode $17_1$ of the first spark unit, and further via the first electrode $16_2$ of the second spark unit, the resistor 12 made of varistors, the second electrode $17_3$ of the third spark unit, the nonlinear resistor 23, the clamp 11, and further to the ground. It may be seen that in this case the nonlinear resistor 12 is included into the discharge circuit; so that after the lightning surge current impulse has passed, said resistor sharply increases its resistance and prevents generation of arc current at 50 Hz frequency.

Figure 6:
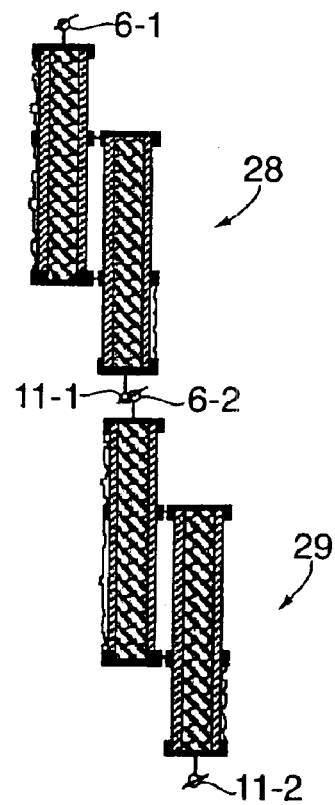
FIGS. 6 to 8 show alternative embodiments of arrester assemblies composed of impulse arresters built on the base of the arrester embodiment shown in FIG. 5.

As has been noted above, in a number of practical cases, for example when high-voltage arresters are unavailable, an arrester assembly may be used instead of a single arrester. Such arrester assembly consists of two or more electrically interconnected arresters of a lower voltage class. Any modifications of the arrester according to the invention can be used as components of the arrester assembly. As an illustration, FIG. 6 presents an embodiment of the arrester assembly comprising two arresters similar to that presented in FIG. 5. In this embodiment the arresters are connected in series. This means that a first clamp 6-1 of a first arrester 28 serves for connecting the assembly to components of a power transmission line or of an electric installation subjected to a high electrical potential U; a second clamp 11-2 of a second arrester 29 is intended to connect the assembly to low-potential components of the power transmission line or of the electric installation; while a second clamp 11-1 of the first arrester 28 is connected to a first clamp 6-2 of the second arrester 29.

Figure 7:
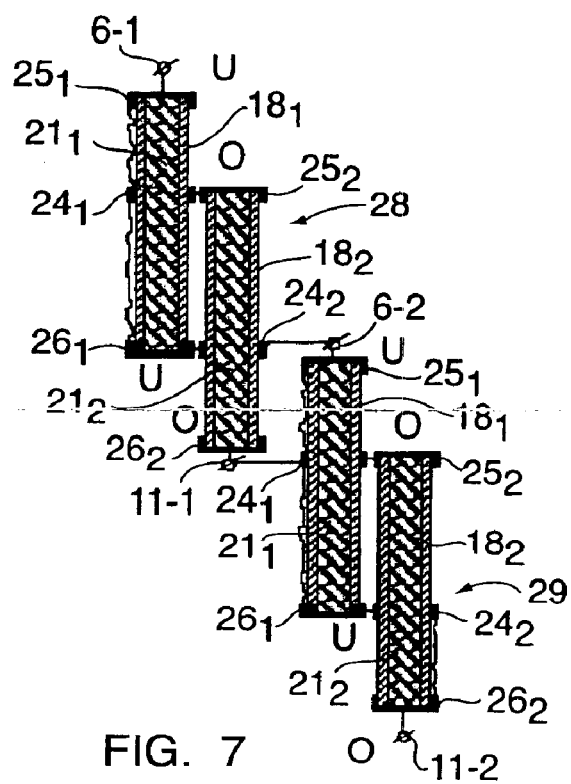

If the arrester embodiment with two tubular bodies is employed, a novel approach to building the arrester assembly consisting of two or more arresters may be used, as illustrated by FIG. 7. In the presented embodiment, the functions of the clamps 6-1 and 11-2 are similar to the functions of the similar clamps in the above-described embodiment of the assembly. However, in this case, a center electrode $24_2$ of a second tubular body $18_2$ of the first arrester 28 is connected to the first clamp 6-2 of the second arrester 29, while the second clamp 11-1 of the first arrester is connected to a center electrode $24_1$ of the first tubular body $18_1$ of the second arrester 29. It is evident that with such connection scheme of arresters 28, 29, high potential U is supplied via a rod electrode (resistor) $21_1$ of the first tubular body $18_1$ and a center electrode $24_2$ of the second tubular body of the first arrester 28 to a first end electrode $25_1$ of the first tubular body $18_1$ of the second arrester 29. The same high potential U is further supplied via a rod electrode (resistor) $21_1$ of the first tubular body $18_1$ of the second arrester 29 to a center electrode $24_2$ of the second tubular body $18_2$ of the second arrester 29.

The low potential 0 is supplied via a rod electrode (resistor) $21_2$ of the second tubular body $18_2$ and a center electrode $24_1$ of the first tubular body $18_1$ of the second arrester 29 to a second end electrode $26_2$ of the second tubular body $18_2$ of the first arrester 28, and is further supplied via the rod electrode (resistor) $21_2$ of the second tubular body $20_2$ of the first arrester 28 to the center electrode $24_1$ of the first tubular body $18_1$ of the first arrester 28.

Thus, the same voltage drop U-0 equal to the effective overvoltage U is simultaneously applied to all spark units of the first and second-arresters of the arrester assembly. Due to this, the response of the individual spark units and of the entire arrester assembly is fast and virtually simultaneous, which ensures better technical performance of the inventive arrester assembly compared to prior art ones.

It is evident that in the above-described embodiment, as in the previous ones, the number of arresters forming the assembly may be increased, if necessary, without a limitation.

As shown by the above-described test of the arrester with two tubular bodies (shown in FIG. 5), when a lightning overvoltage impulse is applied to an arrester with discharge gaps of equal length, the first and the third spark unit are flashed over first, while the second spark unit is flashed over only after a certain time interval. The spark discharge filaments in the first and in the third spark units develop faster than in the second spark unit, because the discharge current in the first and in the third spark units flows only along the discharge path and through one respective resistor, while in the second spark unit the discharge current flows along the discharge path and through two resistors connected in series (those of the first and the second tubular bodies). As a result, the retarding effect of the resistors on the path development is stronger in the second spark unit.

Figure 8:
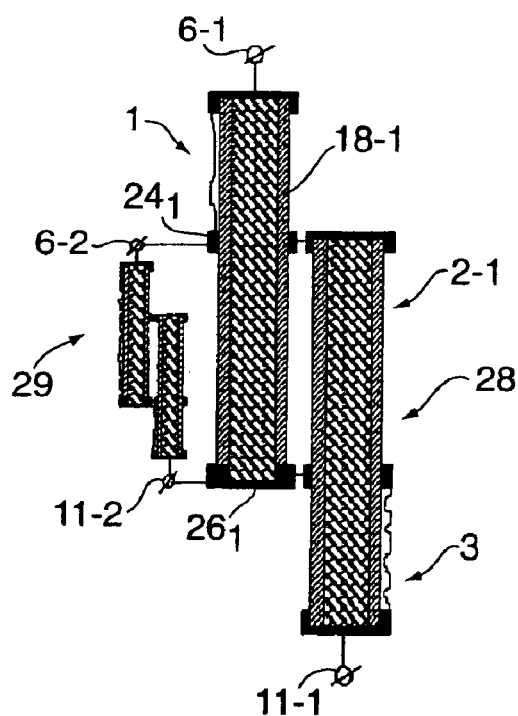

The problem of discharge retardation in the second spark unit can be solved by using the assembly of two arresters presented in FIG. 8. Unlike the previous embodiments, it consists of arresters having different sizes.

A first, larger arrester 28 serves as the main one. By its clamps 6-1 and 11-1 it is connected to protected power transmission components having a high U and a low potential 0, respectively. A second, smaller arrester 29 serves as a supplementary intended to increase simultaneity of response of the spark units in the main arrester 28. The second arrester is connected in parallel to the second spark unit $2_1$ of the first arrester 28 to act as a shunt. More specifically, the first and the second clamps 6-2, 11-2 of the second arrester are connected, respectively, to the center electrode $24_1$ and to the second end electrode $26_1$ of the first tubular body $18_1$ of the first arrester 28. Furthermore, the discharge voltages of the first and third spark units 1, 3 of the first arrester 28 are selected to be similar to the discharge voltage of the second arrester 29. As a result, the flashover of the second arrester 29 takes place virtually simultaneously with the flashover of the spark units 1, 3 of the first arrester 28, ensuring in this way a fast formation of a single common discharge path. Consequently, a fast response of the arrester assembly as a whole is achieved. As a result, higher performance of the assembly is attained compared to a single main arrester.

The embodiments of the arrester assemblies reviewed above employs only arresters of the same type. There are situations, however, when it is advisable to make such assemblies from arresters of different modifications. For example, it has been found that in some cases, when characteristics of arrester components are not selected quite properly or when there presents a scatter in their characteristics, and given an effective overvoltage of a certain value, instead of the flashover of all spark units of the arrester of FIG. 4, only the first spark unit thereof will respond. In this case, quenching of the arc current must be provided taking into account that only a single spark unit had a breakdown. For this purpose, it is advisable to use an arrester assembly comprising an arrester, in which the discharges takes place in a fine-grained insulation environment (such as the arrester shown in FIG. 4), which arrester is connected in series with the described arrester using two tubular bodies.

It is obvious that subject to specific requirements set for the quality of protection of components of power lines and/or high-voltage installations against lightning overvoltages, and subject to availability of such or another modifications of arresters, it can be expedient to use also other combinations of arresters according to the present invention, or of arrester assemblies built up of arresters according to the present invention in combination(s) with appropriate prior art arresters.

We claim:

1. An impulse spark arrester for protecting components of electric power transmission lines or electric installations, said arrester comprising:
    a first clamp and a second clamp for connecting the arrester to components of the power transmission line or electric installation subjected to a higher and a lower potential, respectively;
    a chain of N (N being an odd number equal to or greater than 3) of series-connected spark units, each comprising at least one discharge gap formed by a first main electrode and a second main electrode, which electrodes being electrically connected to an input and an output, respectively, of a corresponding spark unit, the input of a first spark unit and the output of a Nth spark unit being connected to the first clamp and to the second clamp, respectively; and
    N−1 resistors, the output of each odd spark unit, except the last one, being connected via one of said resistors to the second clamp, and the output of each even spark unit being connected via another of said resistors to the first clamp,
    characterized in that the resistance of each Kth (K=1, 2, . . . N−1) resistor meets one of the following conditions:

$R_K > R_{K+2}$ for an odd K, $R_K < R_{K+2}$ for an even K.

2. The impulse arrester according to claim 1, characterized in that the resistors are made of a nonlinear semiconductive material.

3. The impulse arrester according to claim 1, characterized in that at least one of the spark units additionally comprises a body made of a solid dielectric, with the first and the second main electrodes mounted on a surface of said body so as to enable a generation of a surface discharge between said electrodes.

4. The impulse arrester according to claim 3, characterized in that a zone of a development of said surface discharge is filled with fine-grained insulation material.

5. The impulse arrester according to claim 4, characterized in that the fine-grained insulation material is quartz sand.

6. The impulse arrester according to claim 4, characterized in that it is placed inside an insulating sheath.

7. The impulse arrester according to any of claims 2 to 6, characterized in that it is additionally provided with at least one nonlinear resistor connected between one of the clamps and the adjacent spark unit in order to route a surface discharge current to said nonlinear resistor.

8. The impulse arrester according to any of claims 3–6, characterized in that the solid dielectric body is shaped as an elongated cup.

9. The impulse arrester according to claim 8, characterized in that the first and the second main electrodes are arranged at the ends of the solid dielectric body, wherein an additional electrode is arranged inside the solid dielectric body over its entire length, said additional electrode being electrically connected to the second electrode and insulated from the first electrode.

10. The impulse arrester according to any of claims 3–6, characterized in that each of the spark units is arranged for generating a surface discharge between the first main electrode and the second main electrode, wherein:
    said solid dielectric body is common for all said spark units;
    the first clamp and the second clamp are located at the opposite ends of said common solid body;
    N coaxial spaced apart sheds of a dielectric material are provided on a side surface of said common solid body;
    the first main electrode and the second main electrode of one of the spark units are arranged on the opposite surfaces of each fin, at its base; and
    the resistors are located inside said common solid body.

11. The impulse arrester according to any of claims 2 to 5, characterized in that the number N of the spark units is selected to be three, wherein:
    all spark units are arranged so as to enable a generation of the discharge between the first main electrode and the second main electrode over the inner surface of a tubular solid dielectric body, which body is common for all spark units;
    the first electrode of the first spark unit is mounted at one end of said common tubular body;
    the second electrode of the third spark unit is mounted at the opposite end of said tubular body;
    the second electrode of the first spark unit and the second electrode of the second spark unit are mounted on the inner side surface of the common tubular body and serve simultaneously as the first electrode of the second spark unit and the first electrode of the third spark unit, respectively;

the resistors are arranged on the outer surface of the tubular body spaced apart from each other;

the output of the first, odd, spark unit is connected via one of said resistors to the second clamp, while the output of the second, even, spark unit is connected via another resistor to the first clamp; and the inner cavity of the tubular body is filled with fine-grained insulating material, at least in a zone adjacent to a part of the outer surface, along which the flashover discharge is generated.

12. The impulse arrester according to claim 11, characterized in that it is provided with at least one nonlinear resistor installed inside said tubular body in order to route a current of the surface discharge developing in the fine insulating material to said nonlinear resistor.

13. The impulse arrester according to any of claims 2 to 6, characterized in that each spark unit is designed so as to enable generation of a surface discharge between the first main electrode and the second main electrode of said spark unit, wherein:

the arrester comprises two tubular bodies made of the solid dielectric, with a center electrode mounted on the outer surface, and a first and a second end electrodes mounted at the ends of each of said bodies;

the second end electrode and the center electrode of the first tubular body are electrically connected to the center electrode and the first end electrode, respectively, of the second tubular body;

the first main electrode and the second main electrode of the first spark unit are formed, respectively, by the first end electrode and the center electrode of the first tubular body, said first spark unit comprising a part of said tubular body confined between said electrodes;

the first and the second main electrodes of the second spark unit are formed, respectively, by the connections of the center electrode and the second end electrode of the first tubular body to the first end electrode and the center electrode, respectively, of the second tubular body, said second spark unit comprising the parts of said tubular bodies located between said connections;

the first main electrode and the second main electrode of the third spark unit are formed, respectively, by the center electrode and the second end electrode of the second tubular body, said spark unit comprising the part of said second tubular body located between said electrodes;

the resistors are designed as rod electrodes made of the semiconductive material, said electrodes extending inside said tubular bodies and being connected to the end electrodes mounted on the tubular body containing said rod electrodes, the output of the first spark unit being connected via one of said resistors to the second clamp, and the output of the second spark unit being connected via the other said resistor to the first clamp.

14. An impulse lightning spark arrester for protecting components of power transmission lines or electric installations, said arrester comprising:

a chain of N (N=odd number equal to, or greater than 3) series-connected spark units;

N−1 conducting components; and a first clamp and a second clamp for connecting the arrester to components of the power line or the electric installation subjected to a high and a low potential, respectively, wherein each of said spark units comprises at least one discharge gap formed by a first main electrode and a second main electrode, which electrodes being electrically connected to an input and an output, respectively, of a corresponding spark unit, the input of the first spark unit and the output of the Nth spark unit being connected to the first clamp and the second clamp, respectively, wherein each Kth (K=1, 2, . . . N−1) conducting component is connected between the output of the Kth spark unit and one of the clamps, characterized in that all spark units are designed so as to enable generation of a discharge between the first main electrode and the second main electrode over the surface of a solid dielectric body, whereon the first main electrode and the second main electrode are mounted, said body being common for all the spark units, wherein:

the first and the second clamps are mounted at opposite ends of said common solid body;

N coaxial spaced apart sheds of a dielectric material are provided on a side surface of said common solid body;

the first main electrode and the second main electrode of one of the spark units are arranged on the opposite surfaces of each shed, at its base;

the conducting components are designed as resistors of a semiconductive material located inside said common solid body;

the output of each odd spark unit is connected to the second clamp via one of said resistors, while the output of each even spark unit is connected to the first clamp via another of said resistors.

15. The impulse lightning spark arrester according to claim 14, characterized in that a zone of a development of the surface discharge is filled with fine insulating material, preferably constituted by quartz sand, wherein:

the arrester is placed inside an insulating sheath and is additionally provided with at least one nonlinear resistor connected between one of the clamps and its adjacent spark unit in order to route the surface discharge current developing in said material to said nonlinear resistor.

16. An impulse lightning spark arrester for protecting components of power transmission lines or electric installations, said arrester comprising:

a chain of N (N=3) series-connected spark units;

N−1 conducting components; and a first clamp and a second clamp for connecting the arrester to components of the power line or the electric installation subjected to a high and a low potential, respectively, wherein each of said spark units comprises at least one discharge gap formed by a first main electrode and a second main electrode, which electrodes being electrically connected to an input and an output, respectively, of a corresponding spark unit, the input of the first spark unit and the output of the Nth spark unit being connected to the first clamp and the second clamp, respectively, wherein each Kth (K=1, 2) conducting component is connected between the output of the Kth spark unit and one of the clamps, characterized in that:

all spark units are designed so as to enable generation of a discharge between the first main electrode and the second main electrode over the surface of a tubular body made of a solid dielectric, said body being common for all the spark units;

the first electrode of the first spark unit is mounted at one end of said tubular body;

the second electrode of the Nth spark unit is mounted at the opposite end of said tubular body;

the second electrode of the first spark unit and the second electrode of the second spark unit are mounted on the inner side surface of the common tubular body and simultaneously serve as the first electrode of the second spark unit and the first electrode of the third spark unit, respectively;

the conducting components are designed as resistors of a semiconductive material arranged on the outer surface of the tubular body spaced apart from each other;

the output of the first, odd, spark unit is connected via one of said resistors to the second clamp, while the output of the second, even, spark unit is connected via another resistor to the first clamp; and the inner cavity of the tubular body is filled with fine-grained insulating material, at least in a zone adjacent to a part of the side surface, along which the flashover discharge is generated.

17. The impulse arrester according to claim 16, characterized in that it is additionally provided with at least one nonlinear resistor installed inside said tubular body in order to route a current of the surface discharge developing in the fine-grained insulating material to said nonlinear resistor.

18. An impulse lightning spark arrester for protection of components of power transmission lines or electric installations, said arrester comprising:

a chain of three series-connected spark units;

two conducting components; and a first clamp and a second clamp for connecting the arrester to components of the power line or the electric installation subjected to a high and a low potential, respectively, wherein each of said spark units comprises at least one discharge gap formed by a first main electrode and a second main electrode, which electrodes being electrically connected to an input and an output, respectively, of a corresponding spark unit, the input of the first spark unit and the output of the third spark unit being connected to the first clamp and the second clamp, respectively, and the first and the second conducting component being connected between the outputs of the first and the second spark unit and one of the clamps, respectively, characterized in that all the spark units are designed so as to enable generation of a surface discharge between the first main electrode and the second main electrode, wherein:

the arrester comprises two tubular bodies of a solid dielectric, with a center electrode mounted on the outer surface, and a first and a second end electrode mounted at the ends of each of said bodies;

the second end electrode and the center electrode of the first tubular body are electrically connected to the center electrode and the first end electrode, respectively, of the second tubular body;

the first and the second main electrode of the first spark unit are formed, respectively, by the first end electrode and the center electrode of the first tubular body, said spark unit comprising a part of said first tubular body confined between said electrodes;

the first main electrode and the second main electrode of the second spark unit are formed, respectively, by the connections of the center electrode and the second end electrode of the first tubular body to the first end electrode and the center electrode, respectively, of the second tubular body, said second spark unit comprising parts of said tubular bodies located between said connections;

the first and the second main electrode of the third spark unit are formed, respectively, by the center electrode and the second end electrode of the second tubular body, said third spark unit comprising a part of said second tubular body confined between said electrodes;

the conducting components are resistors designed as rod electrodes made of a semiconductive material, said electrodes extending inside said tubular bodies and being connected to the end electrodes mounted on the tubular body containing said rod electrodes;

the output of the first spark unit is connected via one of said resistors to the second clamp, and the output of the second spark unit is connected via the other said resistor to the first clamp.

19. The impulse lightning spark arrester according to claim 18, characterized in that a zone of a development of the surface discharge is filled with fine insulating material, preferably constituted by quartz sand, wherein:

the arrester is placed inside an insulating sheath and is additionally provided with at least one nonlinear resistor connected between one of the clamps and its adjacent spark unit, in order to route a current of the surface discharge developing in said material to said nonlinear resistor.

20. An arrester assembly consisting of M (M being equal to, or greater than 2) electrically connected impulse lightning spark arresters for protecting components of power lines or electric installations, each arrester comprising at least one spark unit, wherein one of said arresters is provided with a first clamp to connect the assembly to components of the power line or the electric installation subjected to a high electrical potential, while another of said arresters is provided with a second clamp to connect the assembly to components of the power line or the electric installation subjected to a low electrical potential, said assembly characterized in that at least one of said arresters is constituted by an arrester according to any of claims 1 to 6.

21. The assembly according to claim 20, characterized in that all arresters of said assembly are connected in series.

22. The assembly according to claim 20, characterized in that all arresters of said assembly are similar to each other.

* * * * *